Feb. 13, 1934.   J. M. NAUL   1,947,423
SELF STARTING SYNCHRONOUS MOTOR
Filed Jan. 7, 1932
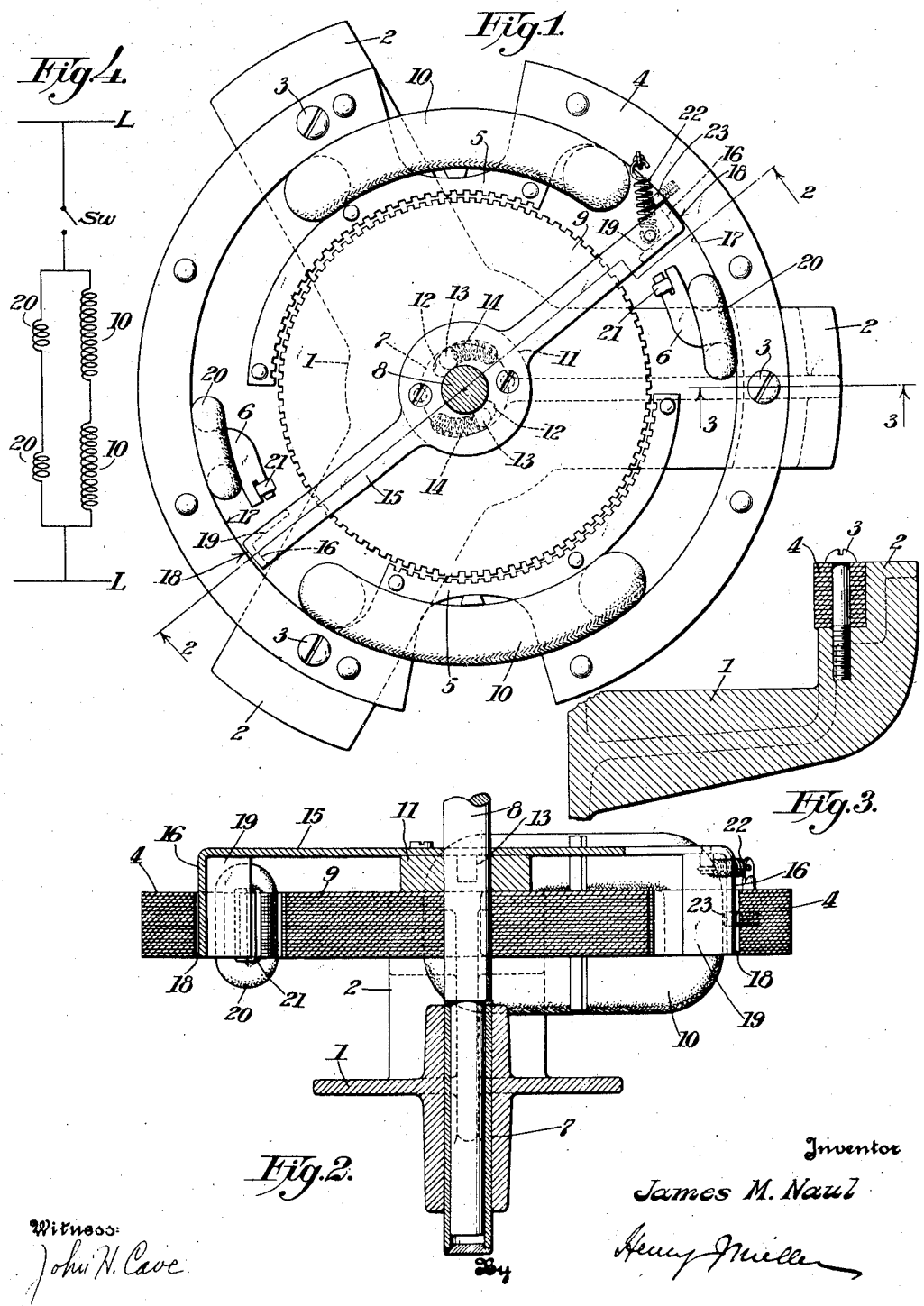
Inventor
James M. Naul
Witness:
John N. Cave Patented Feb. 13, 1934

1,947,423

UNITED STATES PATENT OFFICE 1,947,423

SELF-STARTING SYNCHRONOUS MOTOR

James M. Naul, Fanwood, N. J., assignor to Diehl Manufacturing Company, Elizabeth, N. J., a corporation of New Jersey Application January 7, 1932. Serial No. 585,245

1 Claim. (Cl. 172—279)

This invention relates to synchronous motors more particularly of the slow speed type, suitable for use in driving phonograph turntables, synchronous clocks, etc., and has for an object to provide a motor of this type which is self-starting and which possesses a good running torque.

With the above and other objects in view, as will hereinafter appear, the invention comprises the devices, combinations, and arrangements of parts hereinafter set forth and illustrated in the accompanying drawing of a preferred embodiment of the invention, from which the several features of the invention and the advantages attained thereby will be readily understood by those skilled in the art.

Fig. 1 of the drawing is a plan view of a synchronous motor embodying the invention. Fig. 2 is a section on the line 2—2, Fig. 1. Fig. 3 is a section on the line 3—3, Fig. 1, and Fig. 4 is a diagram of connections.

The motor illustrated is constructed with a skeleton cup-shaped frame 1 to the vertical legs 2 of which is secured by screws 3 the stack 4 of field-laminations having the main poles 5 and starting poles 6.

Journaled in the central vertical bearing 7 in the frame 1 is the motor-shaft 8 carrying the laminated rotor 9. The faces of the poles 5 and the cylindrical face of the rotor 9 are provided with the usual registering teeth to give the motor synchronous running characteristics. The poles 5 are energized by the usual exciting winding or field coils 10 which are connected in series to the motor supply-circuit L, L. While such a motor will run synchronously, it is not self-starting.

According to the present improvement there is mounted to turn upon and relative to the motor shaft 8, a one-way or overruning clutch comprising a collar 11 having therewithin the eccentric cavities 12 for the clutch-rolls 13 backed by the clutch-roll-springs 14. This type of overrunning clutch is well known, per se; the clutch-collar 11 acting to grip and turn the shaft 8 when turned in a clockwise direction, Fig. 1, while the shaft 8 is free to continue running in a clockwise direction after the starting motion of the clutch-collar is stopped.

Screwed to the clutch-collar 11 is the diametrical arm 15 of magnetic material. The arm 15 is formed at its opposite ends with downturned extensions 16 between which and the inner cylindrical surfaces 17 of the field core 4 there are narrow air-gaps 18. The ends of the arm 15 are also formed with the face-portions 19 which are within the range of magnetic attraction of the starting poles 6 of the field core 4. The starting poles 6 are energized by the starting coils 20 which are in series with each other and, together, are in multiple with the main exciting coils 10, as indicated in Fig. 4 in which L, L represent the alternating current supply mains and Sw indicates a single-pole, single-throw switch for starting the motor.

Inasmuch as the starting coils 20 each set up a short path local field across the air gap 18 and across the space between the end of each pole 6 and the corresponding face 19 of the arm 15, the relative polarity of the poles 6, 6 to one another or to the main poles 5, 5, is unimportant. A shading coil 21 is applied to each pole 6 to hold the corresponding face 19 of the arm in contact with the pole end without chattering. A spring 22 is applied to the arm 15 to return it to contact relation with the stop 23 when the switch Sw is opened.

It will be understood that, when the switch Sw is closed, the starting poles 6 will attract the arm 15 with sufficient force to overcome the locking torque between the teeth of the main poles 5 and the rotor 9. The arm 15 will be quickly drawn into contact with the poles 6 and the rotor 9 will be given a sudden starting impulse at or sufficiently near synchronous speed to insure its continued running in step with the main alternating magnetic field. The windings 10 and 20 are preferably so designed and proportioned as to provide a relatively low magnetic density across the air gaps between the main poles 5 and the rotor 9 and a relatively high magnetic density in the local magnetic circuits involving the starting poles 6 and the ends of the clutch-arm 15.

Having thus set forth the nature of the invention, what I claim herein is:—

The combination with an alternating current synchronous motor including a stator-core ring having main internal polar projections, an internal starting polar projection, a shaft, and a toothed rotor embraced by the main polar projections, of means for starting such motor including an overrunning clutch connected to the motor-shaft, and a clutch-arm within the range of attraction of said internal starting polar projection.

JAMES M. NAUL.